(No Model.) 2 Sheets—Sheet 1.
W. COLE, Jr.
AXLE LUBRICATOR.
No. 322,905. Patented July 28, 1885.
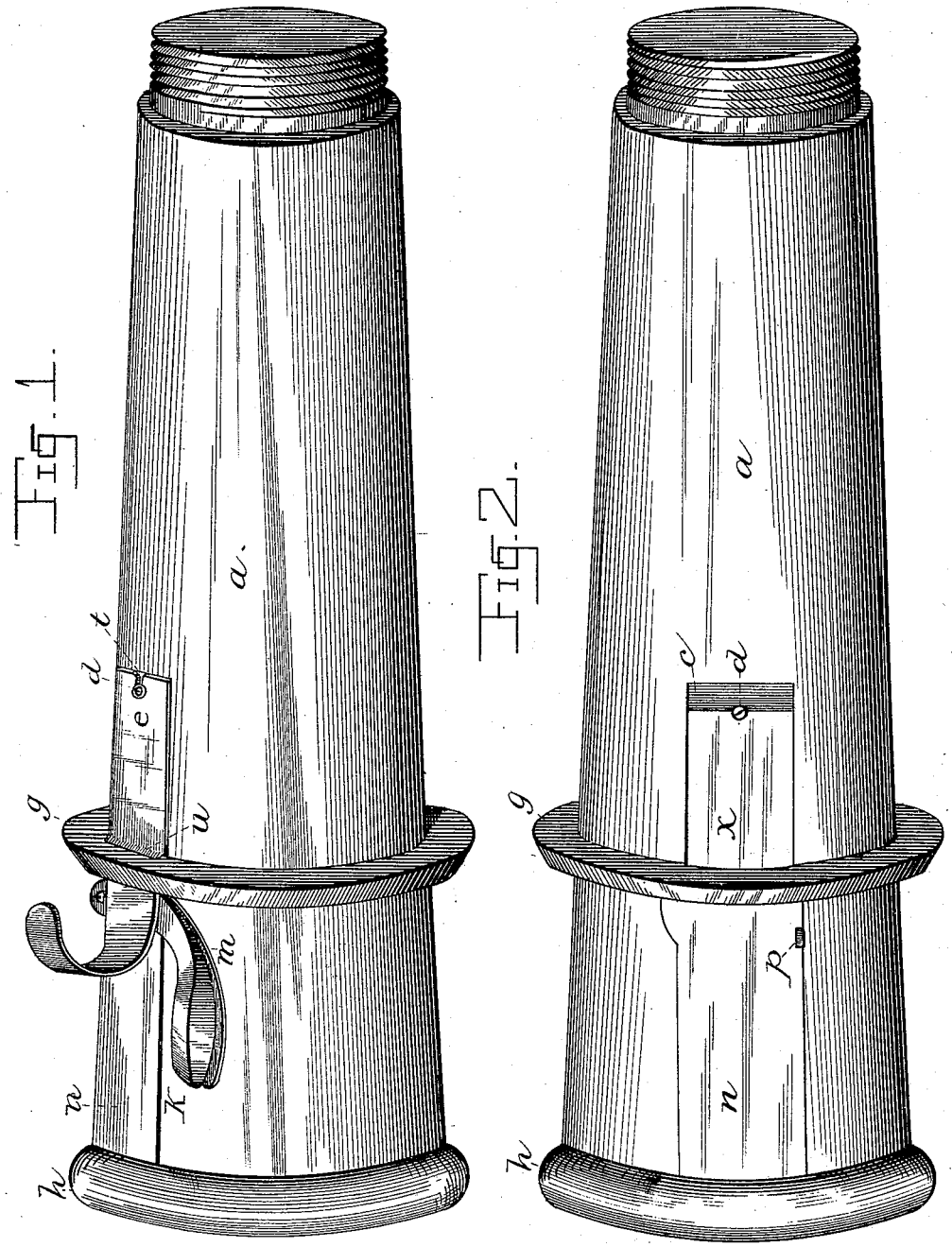

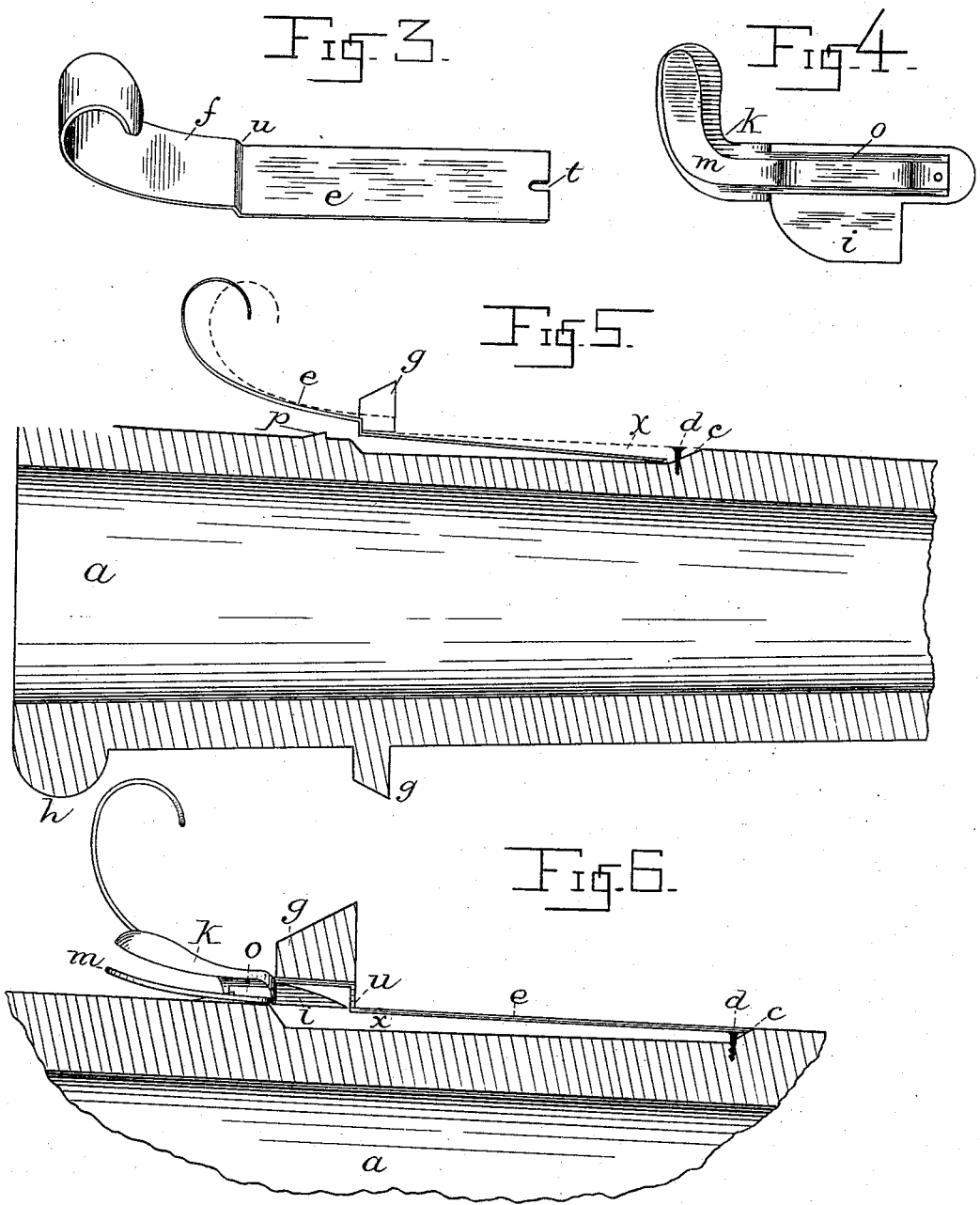

UNITED STATES PATENT OFFICE.

WARREN COLE, JR., OF KEOKUK, IOWA.

AXLE-LUBRICATOR.

SPECIFICATION forming part of Letters Patent No. 322,905, dated July 28, 1885.

Application filed November 15, 1884. (No model.)

*To all whom it may concern:*

Be it known that I, WARREN COLE, Jr., a citizen of the United States, residing at Keokuk, in the county of Lee and State of Iowa, have invented certain new and useful Improvements in Axle-Lubricators; and I do hereby declare the following to be a full, clear, and exact description of the invention, such as will enable others skilled in the art to which it appertains to make and use the same, reference being had to the accompanying drawings, and to the letters and figures of reference marked thereon, which form a part of this specification.

The principal features of my invention are the improved means for applying lubricants to axle-spindles without moving the wheels. Instead of using a long slide reaching almost the entire length of the spindle as has heretofore been customary, I find it much more advantageous to use a short flat slide entering into a corresponding slot in the spindle. This slot extends only a short distance into the bearing portion next the shoulder. A short thin slide provided with a shoulder enters the slot so easily that there is no necessity for cutting away the back band or ridge, nor forming a channel in the outside of the shoulder-band in order to get into the slot, and I merely flatten the outside of the band between the shoulder and the back band. This permits the slide to readily enter the slot with enough grease to fully lubricate the wheel. In this way I am able to preserve the full size of the wood axle back of the shoulder and avoid cutting away and weakening the same when a thimble skein is used. A wedge holds the slide in place, but instead of having a spring back of it, I put the spring in a slot on the under side of the wedge where it is sheltered from droppings of the wheel, and by making the end of the wedge long and hook-shaped the operator is enabled to take a decided hold of the spring and wedge when operating them. By having a beveled flange on one side of the wedge it enters the mouth of the slot and keeps out mud and grit.

My improvements are illustrated in the accompanying drawings, in which, Figure 1 is perspective view of my complete device; Fig. 2, a perspective view showing principally the flat place and short shallow slot; Fig. 3, a perspective view of the slide, showing the shoulder, notch, and general shape; Fig. 4, a bottom view of the wedge, showing the spring used to keep it from jarring loose; Fig. 5, a vertical section showing the location and form of the slot with slide just entering, (dotted lines show the slide in position;) Fig. 6, the wedge holding the slide in position.

Like letters refer to like parts throughout the several views.

$a$ represents a thimble skein, and $x$ a short flat slot formed in the frictional surface of said flat slot skein or spindle. The outer end or mouth of this slot is almost under, or it may be directly under, the shoulder $g$, extending only a short distance toward the nut end of the skein or spindle, and the inner end is provided with an inclined plane, $c$, and screw or pin $d$.

$e$ is the short thin slide, made of thin metal, with a double crook or shoulder, $u$, in or near the middle.

$f$ is that part of the slide, remaining outside of the wheel and serving for a handle. In the end of the slide is made a notch, $t$, which allows it to run astride of the pin or screw and prevents it from slipping out of the slot as the end slides up the inclined plane $c$. The wedge $k$ is hinged near the mouth of the slot $x$, in the usual manner. On the under side of said wedge is the spring $m$, operating within the slot $o$. The flange $i$ is beveled in order to slip under and pry the handle of the slide up against the shoulder, which operation raises the grease part up in line with the periphery of the spindle.

$n$ is the flat place on the shoulder-band between the shoulder $g$ and ridge $h$.

To operate my invention, lift the end of spring $m$ clear of lug $p$ in the operation of throwing the wedge back. Withdraw the slide, load it with grease, and shove it back into the slot $x$. Then press the wedge down under the handle part of slide, whereupon the flange will enter the mouth of the slot $x$, and the spring $m$, slipping over the lug $p$, snaps down behind it and makes the wedge fast. The action of the wheel sufficiently distributes the grease over the spindle.

Having thus described my invention, what I claim as new, and wish to secure by Letters Patent, is—

1. In an axle-lubricator, a spindle or skein having a slot entering the frictional surface thereof through the shoulder, in combination with a slide, substantially as shown and described.

2. In an axle-lubricator, a spindle containing a flat slot provided with an inclined plane and headed screw or pin, in combination with a slide having a notched end, substantially as shown and described.

3. In an axle-lubricator, a skein or spindle provided with a flat or level place on the outside between the back band and shoulder, substantially as shown and described.

4. In an axle-lubricator, a spindle having a short flat slot, in combination with a slide provided with a double crook or shoulder, substantially as described and shown.

5. In an axle-lubricator, a skein or spindle provided with a shallow slot and thin slide, in combination with a wedge or its equivalent having a spring secured thereto, whereby the wedge and slide is held in place, substantially as specified.

6. In an axle-lubricator, a spindle provided with a wedge having a spring on the under side where it is protected from dirt, and a lug whereby the wedge is held in place, substantially as shown and described.

7. The combination, with an axle-lubricator, of a spindle provided with a short shallow slot, $x$, inclined plane $c$, screw or pin $d$, notched and crooked slide lug $p$, flat place $n$, wedge $k$, with spring $m$, attached on under side, substantially as specified.

In testimony whereof I affix my signature in presence of two witnesses.

WARREN COLE, JR.

Witnesses:
F. D. GRIFFITH,
E. G. CAINE.